(12) United States Patent
Murata

(10) Patent No.: US 8,209,913 B2
(45) Date of Patent: Jul. 3, 2012

(54) TUBULAR STRUCTURE AND WIND TURBINE GENERATOR

(75) Inventor: Hajime Murata, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/018,873

(22) Filed: Feb. 1, 2011

(65) Prior Publication Data

US 2012/0049529 A1 Mar. 1, 2012

(51) Int. Cl.
*E04H 12/00* (2006.01)
*E04C 3/00* (2006.01)

(52) U.S. Cl. ............. 52/40; 52/651.01; 52/831; 52/836; 52/848; 52/849; 52/845; 52/844

(58) Field of Classification Search ............... 52/651.01, 52/745.17, 745.18, 836, 848, 849, 845, 40, 52/831, 834, 835, 854, 851, 844
See application file for complete search history.

(56) References Cited

U.S. PATENT DOCUMENTS

| | | | | |
|---|---|---|---|---|
| 5,333,436 A * | 8/1994 | Noble | ............... | 52/849 |
| 5,687,537 A * | 11/1997 | Noble | ............... | 52/849 |
| 6,157,088 A * | 12/2000 | Bendix | ............... | 290/55 |
| 6,380,909 B1 * | 4/2002 | Wilkinson et al. | ............ | 343/890 |
| 6,408,575 B1 * | 6/2002 | Yoshida et al. | .................... | 52/40 |
| 6,470,645 B1 * | 10/2002 | Maliszewski et al. | ...... | 52/745.18 |
| 6,522,025 B2 * | 2/2003 | Willis et al. | ...................... | 290/55 |
| 6,532,700 B1 * | 3/2003 | Maliszewski et al. | ............. | 52/40 |
| 6,957,518 B1 * | 10/2005 | Koch, Jr. | .......................... | 52/849 |
| 7,116,282 B2 * | 10/2006 | Trankina | .......................... | 52/845 |
| 7,160,085 B2 * | 1/2007 | de Roest | .................... | 416/244 R |
| 7,360,340 B2 * | 4/2008 | Grundman et al. | ............... | 52/40 |
| 7,387,497 B2 * | 6/2008 | Cone | .......................... | 416/244 R |
| 7,464,512 B1 * | 12/2008 | Perina | ......................... | 52/651.01 |
| 7,591,119 B2 * | 9/2009 | Ritz | ................................ | 52/835 |
| 7,877,935 B2 * | 2/2011 | Ollgaard | ............................ | 52/40 |
| 8,051,609 B2 * | 11/2011 | Olgaard | ............................ | 52/30 |
| 8,056,297 B2 * | 11/2011 | Mathai et al. | .............. | 52/651.01 |
| 2003/0147753 A1 * | 8/2003 | Ollgaard | ................... | 416/244 A |
| 2006/0228218 A1 * | 10/2006 | Cone | ......................... | 416/244 A |
| 2006/0236648 A1 * | 10/2006 | Grundman et al. | .......... | 52/726.4 |

(Continued)

FOREIGN PATENT DOCUMENTS

JP 2010-077965 4/2010

*Primary Examiner* — Mark Wendell

(74) *Attorney, Agent, or Firm* — Manabu Kanesaka; Kenneth M. Berner; Benjamin J. Hauptman

(57) ABSTRACT

An object of the invention is to propose a tubular structure and a wind turbine generator in which work on an outer surface of the tower structure can be performed easily. A tubular structure comprises: a plurality of tubular sections 21 that are stacked one on top of another in a vertical direction, the adjacent tubular sections 21 being joined together with use of a splice plate 22 arranged on at least one of an inner surface and an outer surface of abutting ends of the adjacent tubular sections 21 and a fastening member 25 fastening the splice plate 22 and the adjacent tubular sections 21; an opening for operation 26 which is arranged in a vicinity of the splice plate 22 on a circumferential surface of the tubular sections 21; and a reinforcing rib 28 arranged in the vertical direction on the circumferential surface of the tubular sections 21, wherein a vertical position of the reinforcing rib 28 includes at least a vertical range where the opening for operation 26 is arranged.

20 Claims, 7 Drawing Sheets

U.S. PATENT DOCUMENTS

| | | | |
|---|---|---|---|
| 2006/0272244 A1* | 12/2006 | Jensen | 52/223.5 |
| 2007/0256388 A1* | 11/2007 | Ianello et al. | 52/651.07 |
| 2007/0294955 A1* | 12/2007 | Sportel | 52/40 |
| 2008/0034675 A1* | 2/2008 | Kristensen | 52/40 |
| 2008/0041009 A1* | 2/2008 | Cairo et al. | 52/651.07 |
| 2008/0256892 A1* | 10/2008 | Franke | 52/655.1 |
| 2009/0016897 A1* | 1/2009 | Olgaard | 416/244 R |
| 2009/0021019 A1* | 1/2009 | Thomsen | 290/55 |
| 2009/0090069 A1* | 4/2009 | Willis | 52/79.12 |
| 2009/0211174 A1* | 8/2009 | Henderson et al. | 52/40 |
| 2009/0223163 A1* | 9/2009 | Quek et al. | 52/651.01 |
| 2010/0024311 A1* | 2/2010 | Wambeke et al. | 52/40 |
| 2010/0071275 A1* | 3/2010 | Mathai et al. | 52/40 |
| 2010/0126079 A1* | 5/2010 | Kristensen | 52/40 |
| 2010/0242406 A1* | 9/2010 | Oliphant et al. | 52/846 |
| 2010/0313497 A1* | 12/2010 | Jensen | 52/173.1 |
| 2010/0319276 A1* | 12/2010 | Kryger et al. | 52/173.1 |
| 2011/0138729 A1* | 6/2011 | Shiraishi | 52/651.01 |
| 2011/0283652 A1* | 11/2011 | Haridasu et al. | 52/651.01 |

* cited by examiner

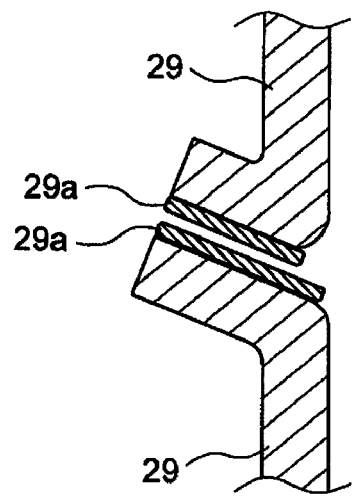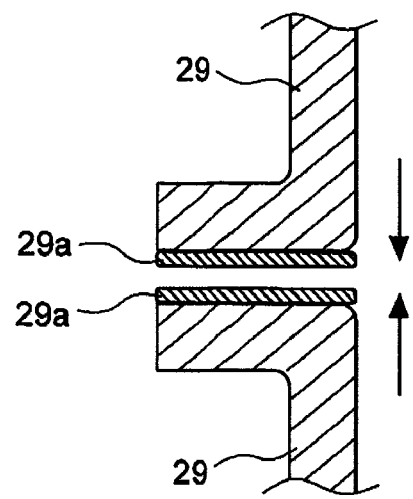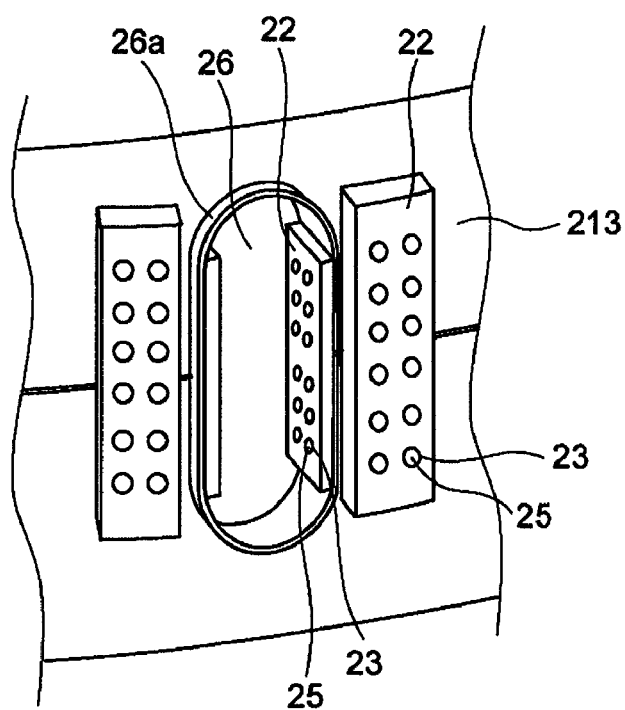

TUBULAR STRUCTURE AND WIND TURBINE GENERATOR

BACKGROUND OF THE INVENTION

1. Field of the Invention

The present invention relates a tubular structure which comprises a plurality of tubular sections connected in a vertical direction and a wind turbine generator, in particular, a tubular structure and a wind turbine generator in which a plurality of tubular sections are joined by means of a splice plate and a fastening member.

2. Description of the Related Art

It has been a well-known technique to form a tubular structure extending in a vertical direction having an object to be supported on top thereof in order to support the object on a high place. For instance, a wind turbine generator comprises a rotor head having a blade mounted thereon, a nacelle housing a generator to which the rotation of the blade is inputted via the rotor head and a tower constituted of a tubular structure for supporting the nacelle rotatably.

The tower is generally made of steel material. The most common type is a monopole type, which is one supporting structure for supporting the blades, the rotor head and the nacelle. In a large-sized wind turbine generator, the height of the tower can range approximately from tens to hundreds meters, and thus from the aspect of production and transportation thereof, the tower is divided into several tubular sections and the plurality of tubular sections are joined with one another to form a tower.

During the process of constructing the wind turbine generator, the plurality of tubular parts are separately transported and joined at a construction site to assemble a tower. As a conventional coupling structure of the tower, a flange projects toward an inner side of the tubular section and the abutting flanges of the adjacent tubular sections are fixed to each other by a high-strength bolt so as to join the adjacent tubular sections.

However, this joining method is a tension joint which uses the high-strength bolt to join the flanges. This requires the flanges to be produced precisely and often uses forging material for the flange, whose material cost per unit is more expensive than rolled steel. Further, When the wind turbine generator using tension joint for connection between tubular sections is assembled at construction site, the preliminary fastening of the bolts is performed after the tubular sections are installed and then the final fastening of the bolts are necessary after installing the blades, the rotor head and the nacelle thereon. Furthermore, to take measure against loosening of the bolts during the operation of the wind turbine generator, a periodic inspection and retightening of the bolts are necessary, resulting in complicating the work.

In view of the above issues, a flangeless tower is proposed. In the flangeless tower, tubular sections are connected without using a flange and the tubular sections are joined by friction joint with use of splice plates. For instance, Patent Document 1 (US2008/0041009A1) proposes the structure wherein a plurality of splice plates, i.e. finger plates are arranged at an even interval on an inner face and an outer face of the adjacent tubular sections and the tubular sections and the splice plates are fastened by bolts and nuts so as to join the adjacent tubular sections. Patent Document 2 (JP2010-077965A) also discloses the structure wherein the arrangement of splice plates is specifically defined.

RELATED ART DOCUMENT

Patent Document

[Patent Document 1] US2008/0041009A1
[Patent Document 2] JP2010-077965A

SUMMARY OF THE INVENTION

Object to be Achieved

The flangeless tower disclosed in Patent Document 1 or 2 has fastening parts such as bolts and nuts disposed on an outer surface of the tubular structure. Thus, for instance, it requires the work on the outer wall of the tubular structure during the construction or the maintenance of the wind turbine generator. A large-sized tubular structure normally has a passage for workers inside thereof. The outer wall of the tower is not accessible from the passage inside the tubular structure, and a scaffold needs to be installed for the work around the outer wall of the tubular structure. This requires longer work hours and increases maintenance cost. For example, the scaffold still needs to be prepared just to check the fastening status of the bolts during the maintenance.

In view of the above issues raised in the prior art, one object of the present invention is to propose a tubular structure and a wind turbine generator in which work on an outer surface of the tower structure can be performed easily.

Means to Solve the Issues

To solve the above issues, a tubular structure of the present invention comprises: a plurality of tubular sections that are stacked one on top of another in a vertical direction, the adjacent tubular sections being joined together with use of a splice plate arranged on at least one of an inner surface and an outer surface of abutting ends of the adjacent tubular sections and a fastening member fastening the splice plate and the adjacent tubular sections; an opening for operation which is arranged in a vicinity of the splice plate on a circumferential surface of the tubular sections; and a reinforcing rib which is arranged in the vertical direction on the circumferential surface of the tubular sections, wherein a vertical position of the reinforcing rib includes at least a vertical range where the opening for operation is arranged.

According to the present invention, the opening for operation is arranged in the vicinity of the splice plate on the circumferential surface of the tubular sections, and thus work on the outer surface of the tubular structure can be easily conducted from the passage inside of the tubular structure via the opening for operation. Therefore, it is no longer necessary to form a scaffold for the work on the outer surface of the tower, thereby saving time and cost for the installation work and the maintenance work. For instance, in the time of installing a wind turbine generator and so on, work such as joining the tubular sections and the splice plate, painting and so on can be easily conducted from inside of the tubular structure without building a scaffold. And the maintenance work such as inspection of the fastening member and so on can also be performed through the opening for operation.

Moreover, the reinforcing rib is arranged in the vertical direction on the circumferential surface of the tubular structure, thereby preventing the strength decrease of the tubular structure due to the disposition of the opening for operation.

It is preferable that the opening for operation has a reinforcing frame which projects from a rim of the opening for operation on at least one of an inner side and/or an outer side of the tubular sections, and the adjacent reinforcing frames are joined each other by means of the splice plate and the fastening member.

By this, the strength around the opening for operation is further improved and the decline of strength of the tower caused by arranging the opening 26 for operation can firmly be prevented.

It is also preferable that each of the tubular sections has a reduced diameter portion which tapers on a side of the abutting end of the tubular section, and wherein the opening for operation, the splice plate and the reinforcing rib are arranged on the reduced diameter portion, and the splice plate and the reinforcing rib are housed within an outermost diameter of the tubular section.

As a result, the splice plate and the reinforcing rib are prevented from sticking out of the outermost circumference of the tubular structure. It is also preferable that the reinforcing rib is formed over the entire height of the reduced diameter part, i.e. the entire length in the vertical direction thereof. This can also reinforce the tapered portion of the reduced diameter part.

The tubular structure may further comprise a tubular cover which surrounds an outer circumference of the tubular sections such as to cover at least the opening for operation.

By providing the tubular cover which surrounds the outer circumference of the tubular sections such as to cover at least the opening for operation as described above, it is possible to prevent the parts such as the fastening member from falling outside, while working on the outer surface of the tower through the opening for operation. As a result, the work safety can be improved. By arranging the tubular cover which surrounds not only the hole for operation but also the splice plate, the fastening member and the reinforcing rib, these parts can be kept from rain water and so on and protected against corrosion.

It is also preferable that the tubular section and the tubular cover are formed integrally, and ends of the tubular covers of the adjacent tubular sections come in contact with each other, and a sealing member is disposed on at least one of the ends of the adjacent tubular covers that are abutted with each other.

By this, the sealing property of the tubular cover can be improved and the tubular cover is protected from the external air getting inside. As a result, the anticorrosive function of the tubular cover can be further improved.

As another aspect of the invention, the present invention provides a wind turbine generator, comprising: a rotor head on which a blade is mounted; a nacelle which is connected to the rotor head and houses a power generation device; and a tower which supports the nacelle. And the tower is preferably configured with the above-described tubular structure. The tubular structure of the present invention can be applied even to the tower, to which the vibration of the blade is transmitted via the rotor head and the nacelle of the wind turbine generator. As a result, it is possible to provide the wind turbine generator that is safe and secure with improved strength.

Effects of the Invention

According to the invention as described above, the opening for operation is arranged in the vicinity of the splice plate on the circumferential surface of the tubular sections, and thus work on the outer surface of the tubular structure can be easily conducted from the passage inside of the tubular structure via the opening for operation. Therefore, it is no longer necessary to form a scaffold for the work on the outer surface of the tower, thereby saving time and cost for the installation work and the maintenance work. For instance, in the time of installing a wind turbine generator and so on, work such as joining the tubular sections and the splice plate, painting and so on can be easily conducted from inside of the tubular structure without building a scaffold. And the maintenance work such as inspection of the fastening member and so on can also be performed through the opening for operation.

Moreover, the reinforcing rib is arranged in the vertical direction on the circumferential surface of the tubular structure, thereby preventing the strength decrease of the tubular structure due to the disposition of the opening for operation.

BRIEF DESCRIPTION OF THE DRAWINGS

FIG. 6 An illustrative view to explain a configuration example of a tubular cover. (A) is an enlarged view of abutting end portions of the adjacent tubular covers which are bent upward with respect to a right angle and (B) is an enlarged view of abutting end portions of the adjacent tubular covers which are bent at a right angle.

FIG. 7 An enlarged view of an example structure of an opening for operation.

DETAILED DESCRIPTION OF THE PREFERRED EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present. In a preferred embodiment of the present invention, a tower of a wind turbine generator is used as an example but the present invention is not limited to this and can be applied to a tubular structure in general which has a plurality of tubular sections joined in a vertical direction.

Figure 1:
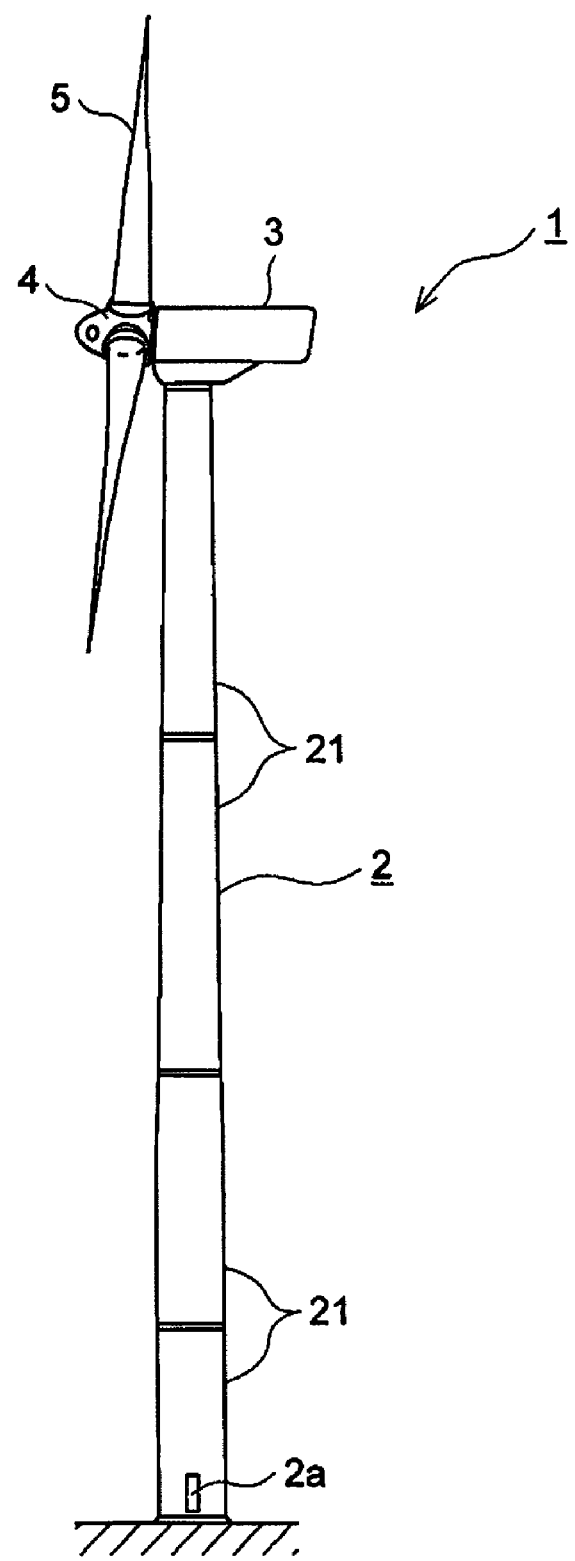
FIG. 1 An overall view of a basic structure of a wind turbine generator in relation to a preferred embodiment of the present invention.

First, a basic structure of the wind turbine generator in relation to a preferred embodiment of the present invention is explained in reference to FIG. 1. The wind turbine generator 1 comprises a tower 2 installed upright on a foundation which is arranged off shore or on shore, a nacelle 3 mounted on a top of the tower 2, a rotor head 4 arranged rotatably with respect to the nacelle 3, and a plurality of blades 5 mounted radially around the rotation axis of the rotor head 4.

The tower 2 is formed into a cylindrical shape extending upward from the foundation and the nacelle 3 having the blades 5 is rotatably supported on the tower 2. Further, the tower 2 is formed by joining a plurality of shells 21 (tubular sections) one another in a vertical direction. The structure of joining the shells 21 one another is explained later. Furthermore, there is an inside passage in the tower 2 for the workers to walk through, and the outside of the tower is accessible from the inside passage through a door 2a.

The nacelle 3 supports the rotor head 4 rotatably and houses devices for generating electric power by the rotation of the rotor head 4. The devices housed in the rotor head 4 are a drive train, an induction generator, a control unit and so on. In the nacelle 3, the rotation force from the rotor head 4 is transmitted to the generator via the drive train so as to generate electric power.

On the rotor head 4, a plurality of the blades 5 extending radially around the rotation axis are arranged at regular intervals in the circumferential direction of the rotor head and a head capsule covers the rotor head 4.

Next, a detailed structure of the shells 21 including the joint structure of the tower 2 is explained in a first preferred embodiment and a second preferred embodiment.

Figure 2:
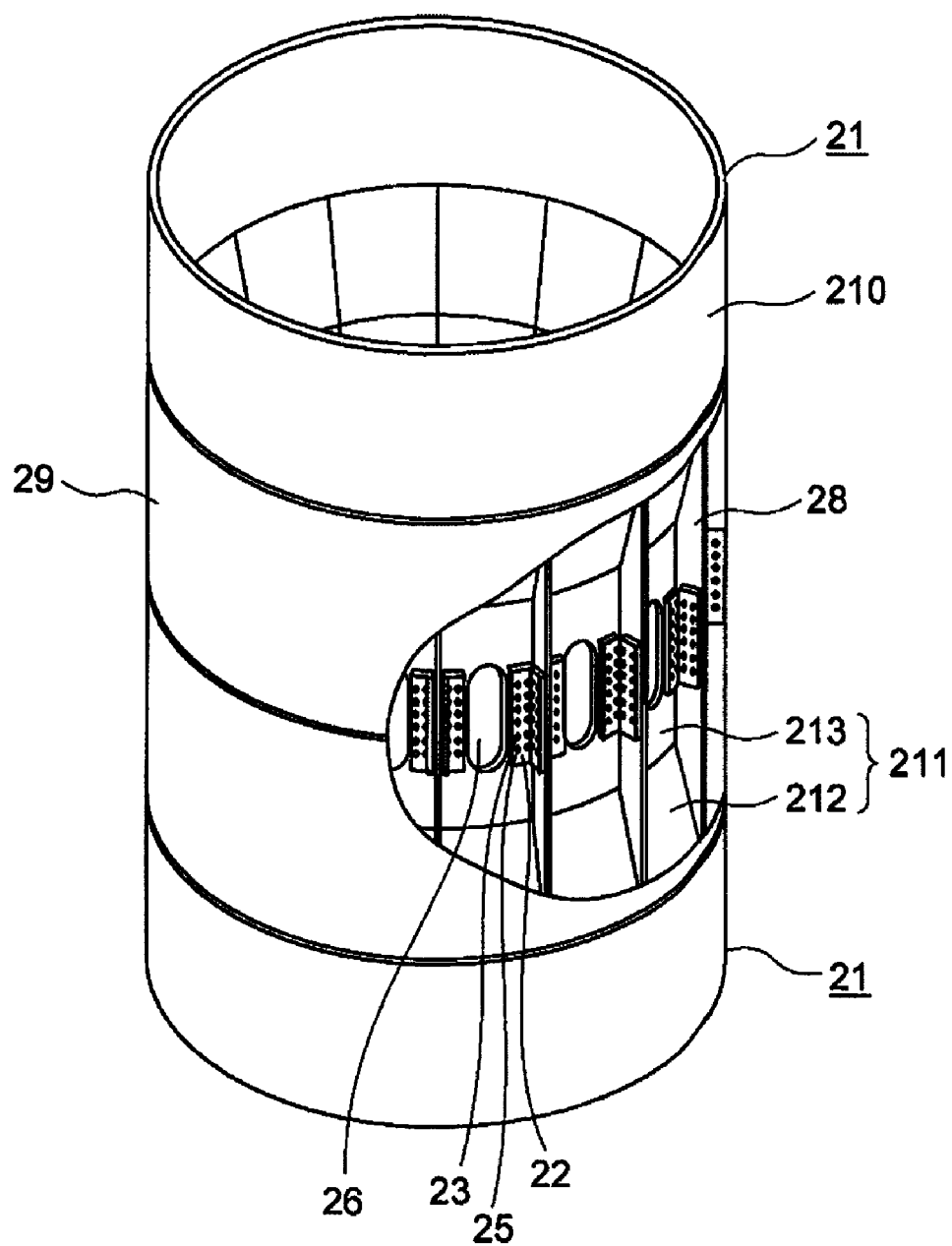
FIG. 2 A perspective illustration of joint structures of connecting shells of a first preferred embodiment of the present invention.
Figure 3:
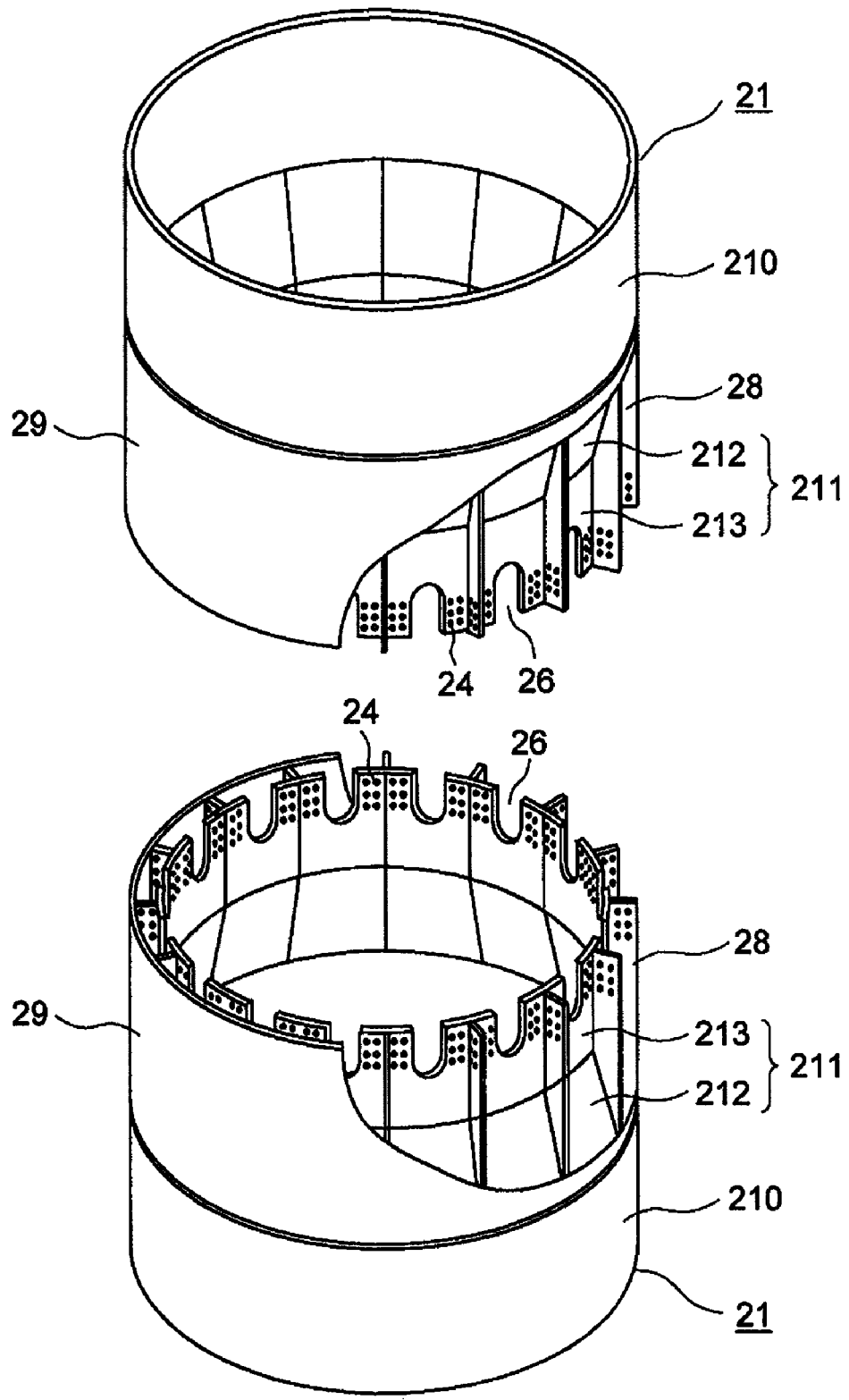
FIG. 3 A perspective view illustrating individually the joint structures prior to connecting shells of the first preferred embodiment of the present invention.
Figure 4:
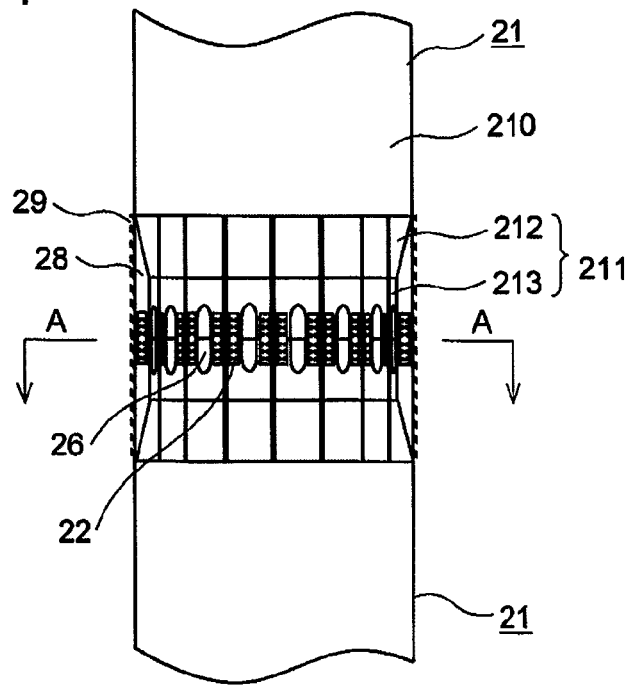
FIG. 4 A side view of a joint structure of the shells

First, a first preferred embodiment of the present invention is explained in reference to FIG. 2 to FIG. 5. FIG. 2 is a perspective illustration of joint structures of connecting shells of the first preferred embodiment of the present invention. FIG. 3 is a perspective view illustrating individually the joint structures before connecting shells of the first preferred embodiment of the present invention. FIG. 4 is a side view of the joint structure of the shells. FIG. 5(A) is a section view taken along the line A-A of FIG. 4, and FIG. 5(B) is an enlarged view of a section B of FIG. 5(A).

In FIG. 2 and FIG. 3, the shells 21 constituting the tower 2 are formed into an almost tubular shape. Each of the shells has a main tubular part 210 in a mid section of the vertical direction and reduced diameter parts 211 on both ends of the main tubular part 210. Further, FIG. 2 is illustrated only one end of main tubular sections to show the joint structure of the shell 21 and a majority of the main tubular section 210 is not illustrated in the drawing. However, the other end of the main tubular sections has the same join structure as the one shown in the drawing.

The reduced diameter parts 211 is constituted of a tapered portion 212 tapering toward the end side of the shell 21 and a joint tubular portion 213 formed between the point with the smallest diameter and the end of the shell. Further, the joint tubular portion 213 has a diameter smaller than that of the main tubular section 210. As shown in FIG. 4, when connecting the adjacent shells 21, the reduced diameter parts 211 form a concave portion on the outer surface of the tower 2.

In the join structure of the shells 21, the adjacent shells 21, 21 are joined together with friction joint with use of a splice plate 22 arranged on at least one surface of abutting end portions of the adjacent shells 21, 21 and a fastening member 25 fastening the splice plate 21 and the adjacent shells 21, 21.

Specifically, the abutting end portions of the joint tubular portions 213 are abutted with each other and the splice plate is arranged on at least one surface of the abutting end portions. The figure shows the splice plates 22 being disposed on both surfaces of the abutting end portions. The splice plate 22 is made of plate-type steel having a curvature to meet a curvature of the shell 21. One splice plate 22 is arranged to lap over two adjacent shells 21, 21. Further a plurality of the splice plates 22 are arranged at regular intervals in the circumferential direction of the shell 21. Each of the splice plates 22 has a plurality of bolt holes 23 and the shell 21 has a plurality of bolt holes 24 which correspond to the bolt holes 23 of the splice plate 22 as illustrated on FIG. 3.

Figure 5A:
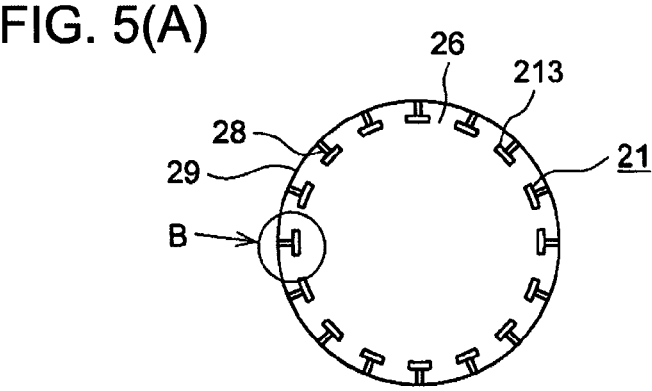
FIG. 5(A) is a section view taken along the line A-A of FIG. 4.
Figure 5B:
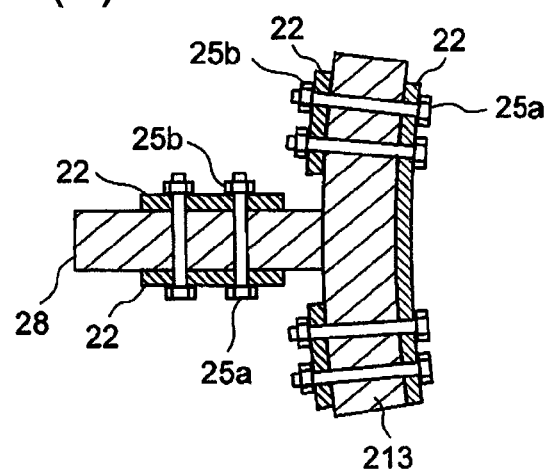
FIG. 5(B) is an enlarged view of a section B of FIG. 5(A).

When joining the adjacent shells 21, 21, first the end portions of the shells 21 are abutted, and then the splice plates 22 are disposed on both surfaces of the abutting end portions of the shells as illustrated in FIG. 5(B). Next, high-strength bolts 25a are inserted through the bolt holes 23 of the splice plates 22 and the bolt holes 24 of the shells 21, and ends of the high-strength bolts 25a are respectively fastened by nuts 25b so as to secure the shells 21 and the splice plates 22. As a result, the adjacent shells 21, 21 are joined with each other by friction joint. Further, the friction joint is a method in which the shells 21, 21 are joined by a friction force generated between the shells and the splice plates 22 by a fastening force of the fastening members 25 fastening the shells 21, 21 and the splice plates 22 (a frictional force generated between the splice plates 22 and the shells 21).

By joining the adjacent shells 21, 21 by friction join in the manner described above, the shell 21 including the ends of shell 21 can be made of rolled steel, whose unit price is cheaper than that of forged flange. As a result, a material cost can be saved. Furthermore, the size of the high-strength bolt 25a used to join the shells 21, can be one of commonly distributed ones so as to reduce the unit price of the bolt 25a. Moreover, the shells 21 are joined by friction joint, thereby reducing fluctuation in the axial force of the bolt 25a by external force. Less frequent periodic inspection and retightening of the bolts can be expected. And the final fastening of the bolts 25a can be performed respectively during the process of joining the shells 21, thereby reducing the installation coast.

In reference to FIG. 2 and FIG. 3, an opening 26 for operation is arranged in the vicinity of the splice plate 22 on the joint tubular portion 213 of the shell 21. A plurality of the openings 26 for operation is arranged at regular intervals in the circumferential direction of the joint tubular portion 213. The openings 26 for operation are preferably arranged in the space between the adjacent splice plates 22, 22. The openings 26 for operation are provided so that a variety of work on the outer surface of the tower, such as joining of the shells 21 and coating/painting operation can be performed from inside of the tower through the openings 26 during the installation or maintenance of the wind turbine generator 1. Specifically, each of the openings 26 which are long in the vertical direction is preferably formed by a pair of the adjacent shells 21. For instance, the opening 26 for operation may be formed into a rectangular shape or oblong shape whose vertical length is approximately the same as that of the splice plate 22.

By providing the openings 26 for operation as described above, it is now possible to perform work on the outer surface of tower 2 from an inside passage through the openings 26 for operation. By this, it is no longer necessary to form a scaffold for the work on the outer surface of the tower, thereby saving time and cost for the installation work and the maintenance work.

Further, reinforcing ribs 28 disposed in the vertical direction are provided on the reduced diameter part of the shell 21. For example, the reinforcing rib 28 may be made of steel, and a plurality of the reinforcing ribs may be arranged in the circumferential direction of the shell 21 at regular intervals. The vertical position of the reinforcing rib 28 preferably includes at least a vertical range where the opening 26 for operation is arranged. It is preferable that the reinforcing rib 28 is formed longer than the opening 26 for operation in the vertical direction. It is also preferable that the reinforcing rib 28 is formed over the entire height of the reduced diameter part 211, i.e. the entire length in the vertical direction thereof. This can also reinforce a taper-angle changing point where the taper angle changes from the tapered portion 212 toward the joint tubular portion 213.

The reinforcing rib 28 may be provided on the inner circumferential surface of the shell 21. In this case, the reinforcing rib 28 extending in the vertical direction is disposed on the inner circumferential surface of the shell 21. In the manner similar to disposing the rib 28 on the outer circumferential surface, the vertical position of the reinforcing rib 28 includes at least the vertical range where the opening 26 for operation is arranged. However, arranging the reinforcing rib 28 on the inner circumferential surface of the shell 21 may reduce the workability in the passage inside the tower. In view of this, it is more preferable to arrange the reinforcing rib 28 on the outer circumferential surface of the shell 21.

The decline in strength of the tower 2 caused by arranging the opening 26 for operation can be compensated by providing the reinforcing rib 28. Further, the reinforcing rib 28 is disposed on the reduced diameter part 211 of the shell and thus the reinforcing rib 28 is prevented from sticking out of the outermost circumference of the tower 2.

Furthermore, the reinforcing rib 28 is arranged such that abutting ends of the reinforcing ribs 28 of the adjacent shells 21, 21 come in contact with each other. And abutting end portions of the reinforcing ribs 28 are preferably joined with use of the splice plate 22 and the fastening member 25.

In this manner, the strength of the shell 21 can be further enhanced by the reinforcing rib 28 and the adjacent shells 21, 21 are joined by the reinforcing ribs 28 as well, thereby improving the joint strength.

In the first preferred embodiment, it is preferable that the wind turbine generator further comprises a tubular cover 29 which surrounds an outer circumference of the reduced diameter part 211 of the shell 21. And the splice plate 22 and the reinforcing rib 28 arranged on the outer surface of the shell 21 are housed in a space between the tubular cover 29 and the shell 21. The tubular cover 29 is, for instance, made of a thin steel plate with a thickness of a few millimeters and formed into a tubular shape having the same diameter of the main tubular part 210 of the shell 21. This tubular cover 29 may be formed integrally with the shell 21 by joining the tubular cover 29 and the shell 21 in advance by welding or the like. In this case, when the adjacent shells 21, 21 are joined together, ends of the tubular covers 29 come in contact with each other. The tubular cover 29 is an integral structure or a separatable structure. The tubular cover 29 may have a shape that has not irregularity on a circumferential surface thereof. For instance, the tubular cover 29 may have a straight shape with a constant diameter or a conical shape.

The tubular covers 29 surrounding the abutting end portions of the shells 21 can protect the splice plate 22 and the fastening member 25 and/or the reinforcing rib 28 against corrosion caused by the external environment. By arranging the tubular cover 29, while working on the outer surface of the tower through the opening 26 for operation, the parts such as the fastening member does not fall outside of the tower, thereby improving the work safety.

FIG. 6 is an illustrative view to explain a configuration example of a tubular cover. FIG. 6 (A) is an enlarged view of abutting end portions of the adjacent tubular covers which are bent upward with respect to a right angle and FIG. 6 (B) is an enlarged view of abutting end portions of the adjacent tubular covers which are bent at a right angle. As shown in the drawings, the end of the tubular cover 29 is bent to the inner circumference side of the tubular cover 29 and a sealing member 29a is disposed on an outer surface of the bent end of the tubular cover 29. The end of the tubular cover 29 may be bent upward with respect to a right angle as shown in FIG. 6 (A) or bent at a right angle as shown in FIG. 6 (B). In the case of being the end upward, top and bottom contact surfaces of the adjacent tubular covers 29 are inclined upward from the outer side to the inner side, thereby preventing rain water and so on from entering the tubular cover 29. On the other hand, in the case of bending the end of the tubular cover 29 at a right angle, it is easy to manufacture the tubular cover 29. The sealing member 29a may be disposed on only one of the bent ends of the adjacent tubular covers that are abutted with each other.

By this, when the adjacent shells 21, 21 are joined together, the sealing members 29a, 29a disposed on the bend ends of the tubular covers 29, or the sealing member 29a and the bent end of the tubular cover come in contact with each other, thereby improving sealing performance of the tubular cover 29 by the sealing member 29a and further preventing the external air from getting inside. As a result, an anticorrosive function of the tubular cover 29 can be further enhanced.

The sealing member 29a used in the preferred embodiment may preferably be elastic material or flexible material with waterproof property. For instance, rubber, gum, elastomer, plastic and the like can be used. Particularly, rubber or gum with a hollow space inside is preferable as the sealing member. This improves the fitting of the sealing member 29a with respect to the clearance between the tubular cover ends which are in contact with the sealing member 29a, thereby further improving the sealing property.

FIG. 7 is an enlarged view of an example structure of the opening for operation. FIG. 7 shows a reinforcing frame 26a which projects from a rim of the opening for operation on at least one of an inner side and an outer side of the joint tubular portion 213, and the adjacent reinforcing frames 26a are joined by means of the splice plate 22 and the fastening member 25. The opening 26 for operation and around it are reinforced by means of the reinforcing frame 26a. Further, the adjacent reinforcing frames 26a are joined by means of the splice plate 22 and the fastening member 25. By this, the strength around the opening 26 for operation is further improved and the decline of strength of the tower 1 caused by arranging the opening 26 for operation can firmly be prevented. The reinforcing frame 26a may be formed integrally with the joint tubular portion 213. Or the reinforcing frame 26a may be formed separately from the joint tubular portion 213 and joined with the joint tubular portion 213 by welding or the like. In the case of forming the reinforcing frame 26a and the joint tubular portion 213 separately, the reinforcing frame 26a may preferably be made of the same material as the joint tubular portion 213 or the material with higher rigidity than the joint tubular portion 213.

Figure 8:
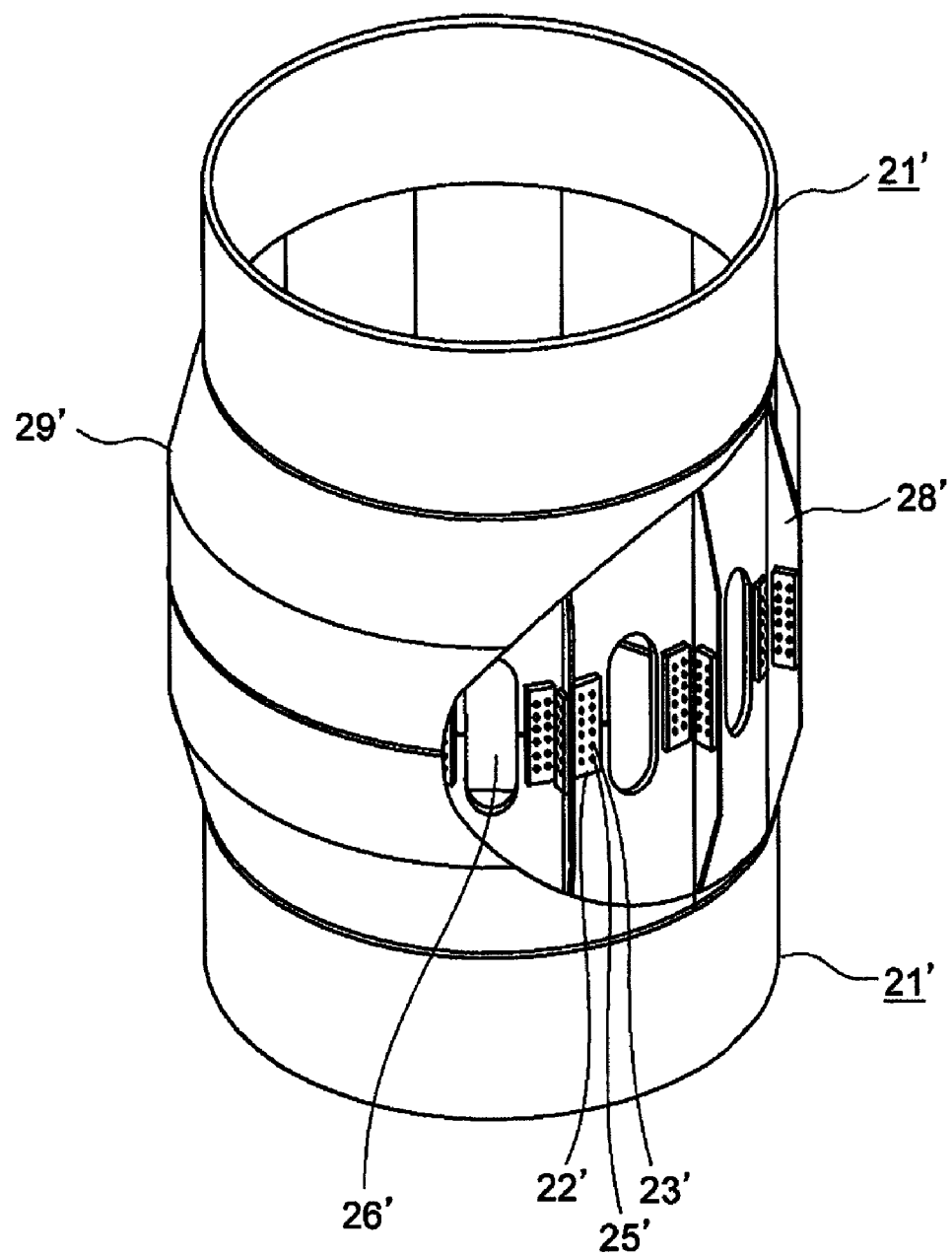
FIG. 8 A perspective view of joint structures of connecting shells of a second preferred embodiment of the present invention.
Figure 9:
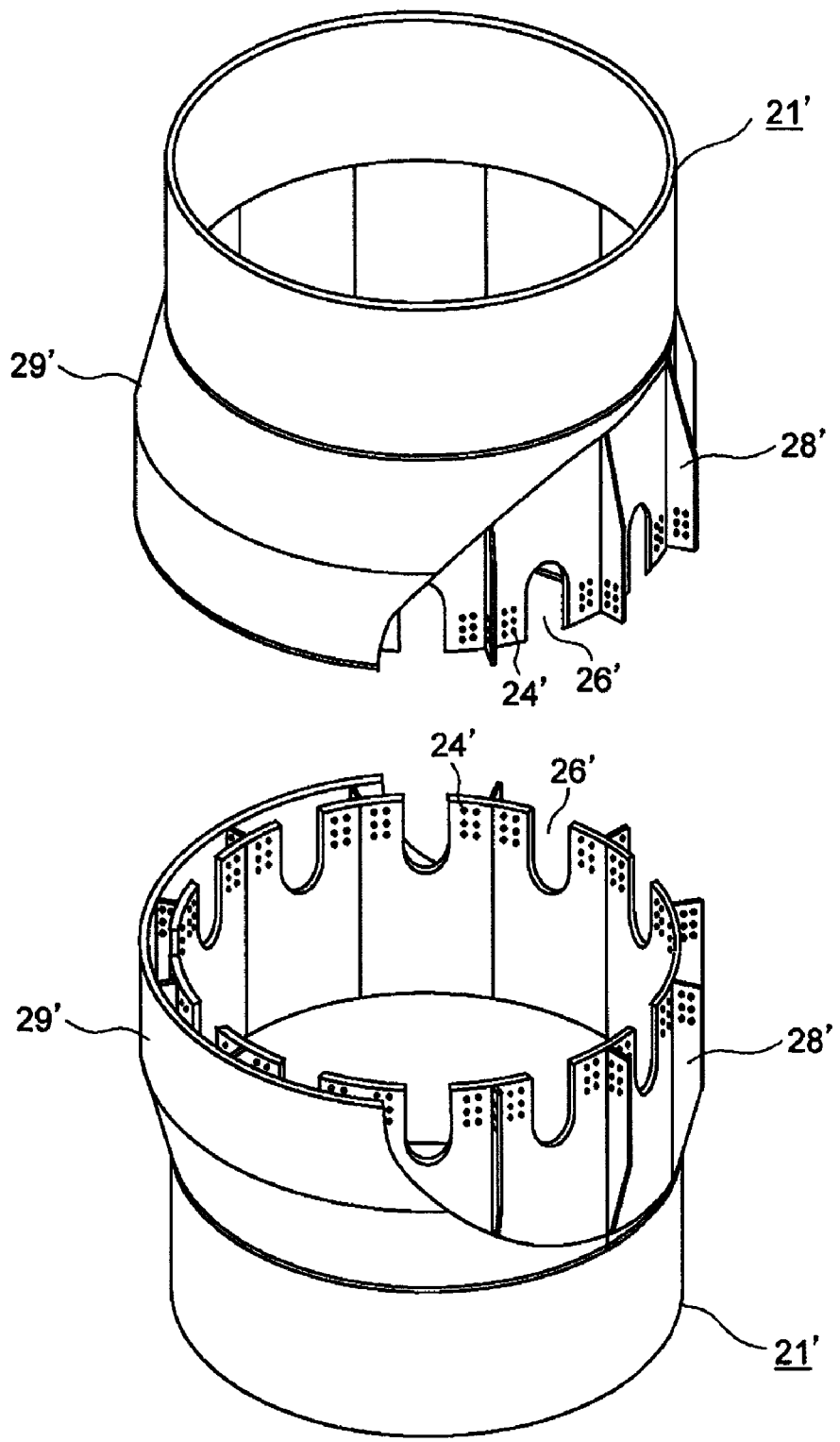
FIG. 9 A perspective view illustrating individually the joint structures prior to connecting shells of the second preferred embodiment of the present invention.

Next, a second preferred embodiment of the present invention is explained in reference to FIG. 8 and FIG. 9. FIG. 8 is a perspective view of joint structures of connecting shells in the second preferred embodiment of the present invention. FIG. 9 is a perspective view illustrating individually the joint structures prior to connecting shells in the second preferred embodiment of the present invention.

FIG. 8 and FIG. 9 illustrate the shells 21' that has no irregularity on the circumferential surface thereof and constitute the tower 2. The shell 21' has the joint structures on both ends thereof. The shell 21' may have a straight shape with a constant diameter or a conical shape. FIG. 8 illustrates one join structure on one end of the shell 21' without showing the majority thereof, but the same join structure is provided on the other end of the shell 21' as well (not shown).

The join structure of the shell 21' comprises the splice plates 22' arranged on at least one surface of abutting end portions of the adjacent shells 21', 21' and the fastening member 25' fastening the splice plate 22' and the shell 21'. The shells 21', 21' are joined by friction join by securing the shells 21' and the splice plate 22' by the fastening member 25'.

Further, the shell 21' has a plurality of openings 26' for operation and a reinforcing ribs 28' in the circumferential direction thereof. The detailed configuration of the joint structure and the openings 26' for operation is the same as that of the first preferred embodiment and thus is not explained further.

The reinforcing rib 28' projects outside of the outermost diameter of the shell 21'. A plurality of the reinforcing rib 28' are arranged at regular intervals in the circumferential direction of the shell 21' in the same manner as the first preferred embodiment and a vertical position of the reinforcing rib is set to include at least a vertical range where the opening 26' for operation is arranged. It is also preferable that the reinforcing rib 28' is formed longer than the opening 26' for operation in the vertical direction. The reinforcing rib 28' may be arranged on the inner circumferential surface of the shell 21'. In the second preferred embodiment, the reinforcing rib 28' is preferably shaped so that its top end or bottom end are cut to match the shape of the inner circumferential surface of the tubular cover 29'.

It is preferable in the second preferred embodiment, the tubular cover 29' is further provided to surround the outer circumference of the abutting end portion of the shell 21'. The tubular cover 29' increases in diameter toward the abutting end portion of the shell 21'. The opening 26' for operation and the reinforcing rib 28' arranged on the outer surface of the shell 21' are housed in a space between the tubular cover 29' and the shell 21'. The tubular cover 29' is, for instance, made of a thin steel plate with a thickness of a few millimeters and structured such that the ends of the adjacent tubular covers 29' come in contact with each other when the adjacent shells 21', 21' are joined. The structure of the tubular cover end is already explained in the first preferred embodiment (See FIG. 6 (A), FIG. 6 (B)). The figures also illustrate bolt holes 23' of the splice plate 22' and bolt holes 24' of the shell 21'.

According to the second preferred embodiment of the present invention, the shell 21' has shape that has no irregularity on its circumferential surface and thus the manufacturing of the shell 21' is easier than the first preferred embodiment. In comparison to the case of providing the reduced diameter part 211 described in the first preferred embodiment, the thickness of the shell 21' at the joint structure can be thinner and thus the weight of the tower can be reduced.

Furthermore, the second preferred embodiment can adopt the same structures as the first preferred embodiment, such as the structure of the abutting ends of the tubular covers (See FIG. 6(A) and FIG. 6(B)) and the structure of reinforcing the openings 26 for operation (See FIG. 7).

NUMBER REFERENCES 1 wind turbine generator
2 tower
3 nacelle
4 rotor head
5 blades
21,21' shell
22,22' splice plate
23,23',24,24' bolt holes
25,25' fastening member
26,26' opening for operation
26a reinforcing frame
28,28' reinforcing rib
29,29' tubular cover
210 main tubular part
211 reduced diameter part
212 tapered portion
213 joint tubular portion

The invention claimed is:

1. A tubular structure comprising:
a plurality of tubular sections that are stacked one on top of another in a vertical direction, the adjacent tubular sections being joined together with use of a splice plate arranged on at least one of an inner surface and an outer surface of abutting ends of the adjacent tubular sections and a fastening member fastening the splice plate and the adjacent tubular sections;
an opening for operation which is arranged in a vicinity of the splice plate on a circumferential surface of the tubular sections; and
a plurality of reinforcing ribs which is arranged in the vertical direction on the circumferential surface of the tubular sections,
wherein a vertical range of the reinforcing ribs include at least a vertical range of an area where the opening for operation is arranged, said area horizontally extending between adjacent reinforcing ribs and the opening vertically extending between ends of the adjacent ribs.

2. The tubular structure according to claim 1,
wherein the opening for operation has a reinforcing frame which projects from a rim of the opening for operation on at least one of an inner side and an outer side of the tubular sections, and the adjacent reinforcing frames are joined by means of the splice plate and the fastening member.

3. A wind turbine generator, comprising:
a rotor head on which a blade is mounted;
a nacelle which is connected to the rotor head and houses a power generation device; and
a tower which supports the nacelle,
wherein the tower is configured with the tubular structure of claim 2.

4. The tubular structure according to claim 2,
wherein each of the tubular sections has a reduced diameter portion which tapers on a side of the abutting end of the tubular section, and
wherein the opening for operation, the splice plate and the reinforcing rib are arranged on the reduced diameter portion, and the splice plate and the reinforcing rib are housed within an outermost diameter of the tubular section.

5. A wind turbine generator, comprising:
a rotor head on which a blade is mounted;
a nacelle which is connected to the rotor head and houses a power generation device; and
a tower which supports the nacelle,
wherein the tower is configured with the tubular structure of claim 4.

6. The tubular structure according to claim 4, further comprising:
a tubular cover which surrounds an outer circumference of the tubular sections such as to cover at least the opening for operation.

7. A wind turbine generator, comprising:
a rotor head on which a blade is mounted;
a nacelle which is connected to the rotor head and houses a power generation device; and
a tower which supports the nacelle,
wherein the tower is configured with the tubular structure of claim 6.

8. The tubular structure according to claim 6,
wherein the tubular section and the tubular cover are formed integrally, and ends of the tubular covers of the adjacent tubular sections come in contact with each other, and a sealing member is disposed on at least one of the ends of the adjacent tubular covers that are abutted with each other.

9. The tubular structure according to claim 2, further comprising:
a tubular cover which surrounds an outer circumference of the tubular sections such as to cover at least the opening for operation.

10. A wind turbine generator, comprising:
a rotor head on which a blade is mounted;
a nacelle which is connected to the rotor head and houses a power generation device; and
a tower which supports the nacelle,
wherein the tower is configured with the tubular structure of claim 9.

11. The tubular structure according to claim 9,
wherein the tubular section and the tubular cover are formed integrally, and ends of the tubular covers of the adjacent tubular sections come in contact with each other, and a sealing member is disposed on at least one of the ends of the adjacent tubular covers that are abutted with each other.

12. The tubular structure according to claim 1,
wherein each of the tubular sections has a reduced diameter portion which tapers on a side of the abutting end of the tubular section, and
wherein the opening for operation, the splice plate and the reinforcing rib are arranged on the reduced diameter portion, and the splice plate and the reinforcing rib are housed within an outermost diameter of the tubular section.

13. A wind turbine generator, comprising:
a rotor head on which a blade is mounted;
a nacelle which is connected to the rotor head and houses a power generation device; and
a tower which supports the nacelle,
wherein the tower is configured with the tubular structure of claim 12.

14. The tubular structure according to claim 12, further comprising:
a tubular cover which surrounds an outer circumference of the tubular sections such as to cover at least the opening for operation.

15. A wind turbine generator, comprising:
a rotor head on which a blade is mounted;
a nacelle which is connected to the rotor head and houses a power generation device; and
a tower which supports the nacelle,
wherein the tower is configured with the tubular structure of claim 14.

16. The tubular structure according to claim 14,
wherein the tubular section and the tubular cover are formed integrally, and ends of the tubular covers of the adjacent tubular sections come in contact with each other, and a sealing member is disposed on at least one of the ends of the adjacent tubular covers that are abutted with each other.

17. The tubular structure according to claim 1, further comprising:
a tubular cover which surrounds an outer circumference of the tubular sections such as to cover at least the opening for operation.

18. A wind turbine generator, comprising:
a rotor head on which a blade is mounted;
a nacelle which is connected to the rotor head and houses a power generation device; and
a tower which supports the nacelle,
wherein the tower is configured with the tubular structure of claim 17.

19. The tubular structure according to claim 17,
wherein the tubular section and the tubular cover are formed integrally, and ends of the tubular covers of the adjacent tubular sections come in contact with each other, and a sealing member is disposed on at least one of the ends of the adjacent tubular covers that are abutted with each other.

20. A wind turbine generator, comprising:
a rotor head on which a blade is mounted;
a nacelle which is connected to the rotor head and houses a power generation device; and
a tower which supports the nacelle,
wherein the tower is configured with the tubular structure of claim 1.

* * * * *